(12) United States Patent
Espinosa et al.

(10) Patent No.: US 9,181,061 B2
(45) Date of Patent: Nov. 10, 2015

(54) PUSHER ASSEMBLY WITH DYNAMIC WIDTH ADJUSTMENT FOR STACKER

(71) Applicant: Illinois Tool Works Inc., Glenview, IL (US)

(72) Inventors: Medardo Espinosa, Hialeah, FL (US); Jeremy Dicon Hyne, Miami Beach, FL (US)

(73) Assignee: Signode Industrial Group LLC, Glenview, IL (US)

( * ) Notice: Subject to any disclaimer, the term of this patent is extended or adjusted under 35 U.S.C. 154(b) by 87 days.

(21) Appl. No.: 13/764,351

(22) Filed: Feb. 11, 2013

(65) Prior Publication Data

US 2013/0209214 A1    Aug. 15, 2013

Related U.S. Application Data

(60) Provisional application No. 61/597,560, filed on Feb. 10, 2012.

(51) Int. Cl.
*B65H 31/30*    (2006.01)
*B65G 17/26*    (2006.01)
*B65B 25/14*    (2006.01)
*B65G 61/00*    (2006.01)

(52) U.S. Cl.
CPC ............ *B65H 31/3081* (2013.01); *B65B 25/14* (2013.01); *B65G 17/26* (2013.01); *B65G 61/00* (2013.01); *B65H 2301/4222* (2013.01); *B65H 2301/42112* (2013.01); *B65H 2301/42266* (2013.01); *B65H 2402/351* (2013.01); *B65H 2404/2321* (2013.01); *B65H 2511/20* (2013.01); *B65H 2513/51* (2013.01); *B65H 2701/1932* (2013.01); *Y10S 414/114* (2013.01)

(58) Field of Classification Search
USPC .............. 198/459.8, 468.1, 626.1; 270/58.31; 271/189, 221, 222; 414/788.6, 788.9, 414/789, 789.1, 789.9, 790.3, 790.8, 790.9, 414/791, 792.2, 792.4, 792.8, 907
See application file for complete search history.

(56) References Cited

U.S. PATENT DOCUMENTS

| | | | |
|---|---|---|---|
| 3,343,334 A * | 9/1967 | Bode et al. ...................... | 53/528 |
| 4,749,077 A | 6/1988 | Sjogren | |
| 5,433,582 A * | 7/1995 | Medina ...................... | 414/788.3 |
| 6,585,262 B2 * | 7/2003 | Nakanishi ...................... | 271/270 |

(Continued)

FOREIGN PATENT DOCUMENTS

| | | | |
|---|---|---|---|
| CH | 567996 A * | 10/1975 | |
| CH | 609306 A * | 2/1979 | |

(Continued)

*Primary Examiner* — Gregory Adams
(74) *Attorney, Agent, or Firm* — Levenfeld Pearlstein, LLC

(57) ABSTRACT

A pusher assembly for a stacker includes first and second opposing moving sidewalls, each sidewall defining a lateral side of a chute region, the chute region defining a centerline therethrough. A first pusher is located on the first sidewall and is movable therewith and a second pusher is located on the second sidewall and is movable therewith. The first and second pushers, when in a home position, are staggered from one another relative to the centerline. The first pusher engages a leading edge of a stack of material in the stacker and the second pusher engages a trailing edge of the stack. In a conveying position, the first sidewall moves to engage the first pusher with the trailing edge of the stack of material, and the first and second sidewalls both move in a forward direction to discharge the stack of material.

12 Claims, 3 Drawing Sheets

(56) References Cited

U.S. PATENT DOCUMENTS

| | | |
|---|---|---|
| 6,692,220 B2 * | 2/2004 | Pluss et al. ................. 414/790.3 |
| 6,945,530 B2 * | 9/2005 | Cinotti et al. ................. 271/240 |
| 6,966,743 B2 * | 11/2005 | Eugster ...................... 414/790.3 |
| 7,828,507 B2 | 11/2010 | Honegger |
| 2001/0042673 A1 * | 11/2001 | Nakanishi ................. 198/419.3 |

FOREIGN PATENT DOCUMENTS

| | | | |
|---|---|---|---|
| EP | 1362817 A1 | * | 11/2003 |
| EP | 1826164 A1 | * | 8/2007 |
| GB | 2364681 A | * | 2/2002 |

* cited by examiner

PUSHER ASSEMBLY WITH DYNAMIC WIDTH ADJUSTMENT FOR STACKER

BACKGROUND

Devices are known for forming stacks of objects, such as printed materials. For example, newspapers are stacked and bundled for subsequent handling and transport.

As part of a typical operation, the objects are stacked in a stacker, on top of a turntable, to a desired quantity or height. Partial stacks may be rotated to equalize the height of the material in the stack. Once the final desired height is achieved, the completed stack is conveyed out of the stacker to a downstream operation, such as a strapping machine in which a strap is positioned around the stack for ease of handling.

In known stackers, the objects are introduced from above through a chute or other conveyance. A pair of parallel opposing moving walls are mounted on the turntable. The walls, often formed as belts, define lateral sides of the stacker. The walls move in the direction in which the stack is conveyed out of the stacker.

Four pushers are positioned on the walls to engage the edges of the stack and facilitate moving the stack out of the stacker. In such stackers, the pushers are positioned at each corner to engage the front and rear edges of the stack along both sides, in a symmetrical manner. As the walls move, the pushers, which also move in a symmetrical manner, push the stack from the stacker into the downstream process, e.g., a strapping machine.

The walls, which have a flattened oval profile, engage the sides of the stack throughout its movement through the stacker, and move in symmetrical, mirror image paths relative to one another. That is, if one wall moves in a clockwise direction, the opposite wall moves in a synchronous counter-clockwise direction. One such stacker is described in Sjogren, U.S. Pat. No. 4,749,077, the disclosure of which is incorporated herein by reference.

One drawback to some known stackers is that the pushers are fixed relative to the moving walls. That is, the distance between the pushers as mounted to the walls is fixed. In order to change the size or dimension along the wall to, for example, accommodate materials of different sizes (widths), the pushers must be removed from the wall and remounted to the wall at the desired location or distance from one another. Alternatively, spacers are used to adjust the pusher locations on the walls. Such adjustments can be time consuming given that many such objects have different widths.

Another known stacker allows for adjusting the stacker to accommodate materials of different widths, but requires a complex mechanism with a substantial number of components and motors (or drives) to accomplish this adjustment.

With respect to the materials, typically, broadsheet type newspapers have a different width than tabloid type newspapers. And, one broadsheet may have a different width than other broadsheets. Thus, with each change in size of objects to be stacked, known stackers must be taken out of service and the pushers repositioned to match the size of the objects to be stacked.

Accordingly, there is a need for a stacker that allows for stacking and conveying objects of different sizes. Desirably, such a stacker can accommodate materials of different size without the need to take the stacker out of service to make such adjustments. More desirably still, such a stacker permits adjustment to be carried out as the stacker is operating or "on-the-fly".

BRIEF SUMMARY

A pusher assembly for a stacker includes first and second opposing moving sidewalls. Each sidewall defines a lateral side of a chute region and the chute region defines a centerline therethrough. A first pusher is located on the first sidewall and is movable therewith and a second pusher is located on the second sidewall and is movable therewith.

The first and second pushers, when in a home position, are staggered from one another relative to the centerline. The first pusher is engaged with a leading edge of a stack of material in the stacker and the second pusher is engaged with a trailing edge of the stack of material in the stacker.

In a conveying position, the first sidewall moves to engage the first pusher with the trailing edge of the stack of material, and the first and second sidewalls both move in a forward direction such that the first and second pushers discharge the stack of material from the chute region.

In an embodiment, two first pushers ((a) and (b) first pushers) are located on the first sidewall diametrically opposed to one another and two second pushers ((a) and (b) second pushers) are located on the second sidewall diametrically opposed to one another. In the home position, the (a) first pusher is engaged with the leading edge of the stack of material and the (a) second pusher is engaged with the trailing edge of the stack of material. In the conveying position, the first sidewall moves so that the (b) first pusher engages the trailing edge of the stack of material. The (a) second pusher and the (b) first pusher then move in the forward direction to discharge the stack of material from the chute.

After discharge of the stack of materials from the chute, the (b) first pusher and (b) second pusher move to the home position. In returning to the home position, the (b) first pusher moves in a reverse direction and the (b) second pusher moves in either direction.

The pusher assembly includes a drive associated with each of the sidewalls. The drives are operable independently of one another. The drives for the sidewalls are operable in the forward and directions.

The stacker includes at least one sensor that is configured to sense the location of the first pusher relative to the home position and at least one sensor configured to sense the position of the second pusher relative to the home position.

The sidewalls are mounted to a turntable to permit rotation of the stack as the materials are introduced to the stacker.

A method for pushing a stack of material from a stacker includes positioning an (a) first pusher at a leading edge of the stack of materials, along a first lateral side of the stack of materials at a home position and positioning an (a) second pusher at a trailing edge of the stack of materials, along a second side of the stack of materials, opposite the first side of the stack of materials at the home position.

The method further includes moving a (b) first pusher into engagement with the trailing edge of the stack of materials on the first lateral side of the stack of materials to a conveyance position, and moving the (b) first pusher and the (a) second pusher to discharge the stack of materials from the stacker.

Further, the method includes positioning the (b) first pusher at the home position and positioning a (b) second pusher at the home position.

In one method, positioning the (b) first pusher at the home position includes moving the (b) first pusher in a reverse direction, and positioning the (b) second pusher includes moving the (b) second pusher in a forward direction coincident with moving the (b) first pusher in the reverse direction.

The method can include sensing the location of the first and second pushers at the home position.

These and other features and advantages of the present invention will be apparent from the following detailed description, in conjunction with the appended claims.

BRIEF DESCRIPTION OF THE DRAWINGS

The benefits and advantages of the present disclosure will become more readily apparent to those of ordinary skill in the relevant art after reviewing the following detailed description and accompanying drawings, wherein.

DETAILED DESCRIPTION

Figure 1:
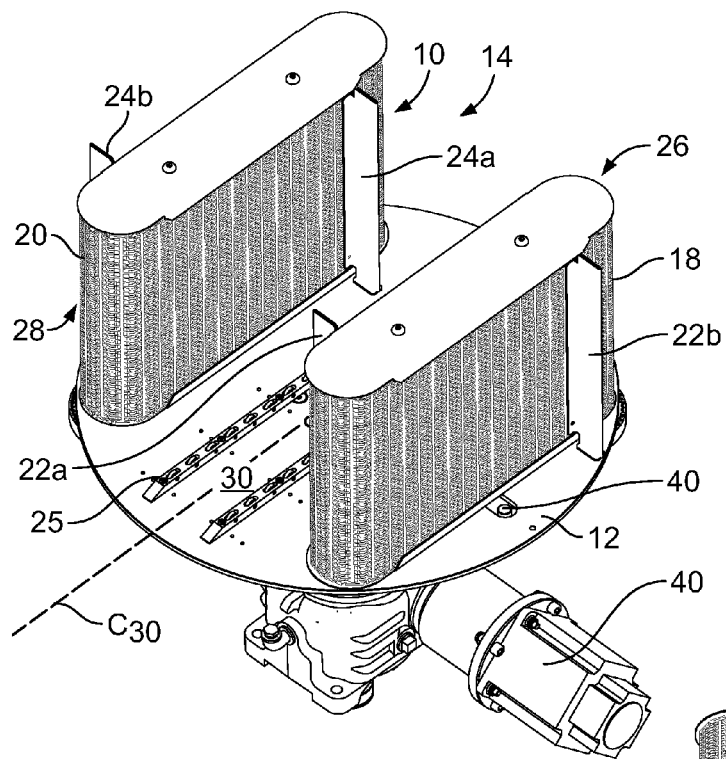
FIG. 1 is a top perspective illustration of a stacker, including a turntable and moving sidewalls positioned on the turntable, the stacker including a dynamic width adjustment.

While the present disclosure is susceptible of embodiment in various forms, there are shown in the drawings and will hereinafter be described several preferred embodiments with the understanding that the present disclosure is to be considered an exemplification thereof and is not intended to limit the disclosure to the specific embodiments illustrated.

Figure 2:
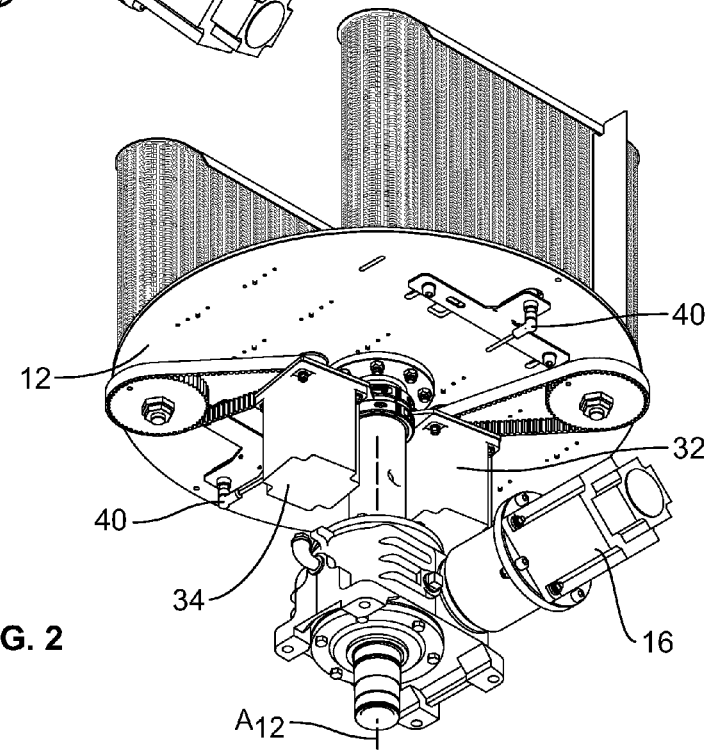
FIG. 2 is bottom perspective illustration of the stacker of FIG. 1, and illustrates the sidewall drives and turntable drive.
Figure 3:
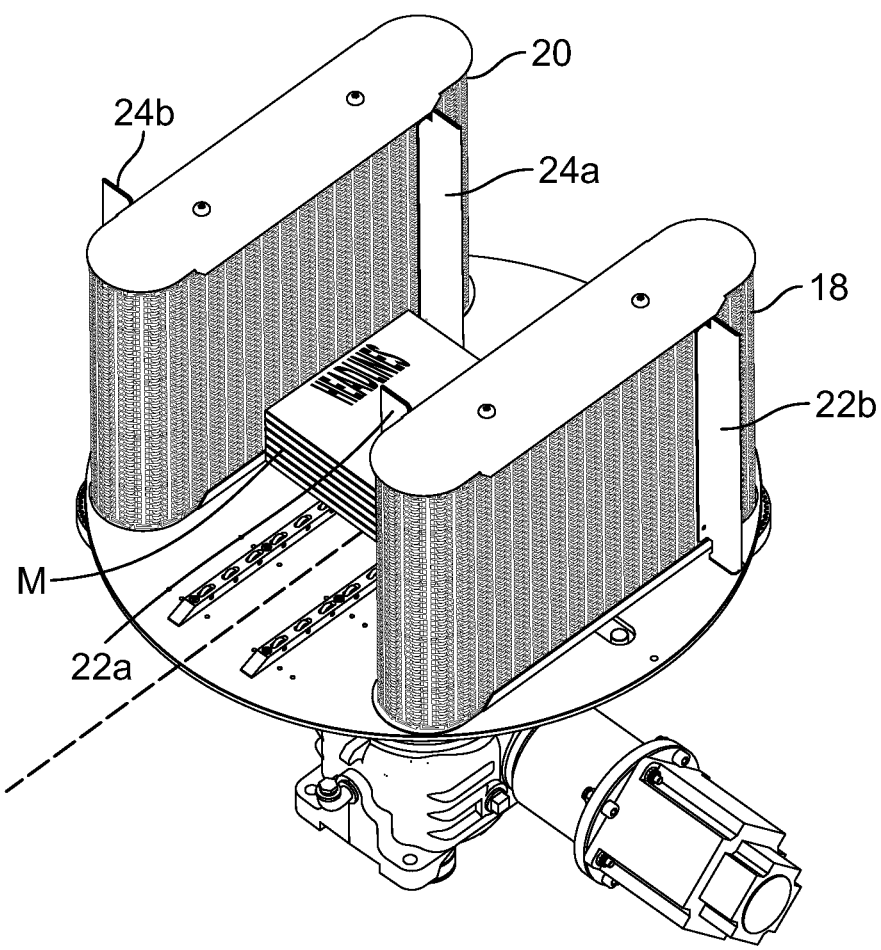
FIG. 3 is a top perspective illustration of a stacker in the home position as materials are stacked in the stacker, the first pusher engaging the leading edge of the stack of materials and the second pusher engaging the trailing edge of the stack of materials.

Referring now to the figures and in particular to FIGS. 1-3, there is shown a portion of a stacker assembly 14 that includes a pusher assembly 10 with dynamic width adjustment. The pusher assembly 10, which will be described in more detail below, is mounted to a turntable 12. The turntable 12 rotates about a central axis $A_{12}$ so that the orientation of material M in the stacker 14 can be rotated 180 degrees to allow for more even stacking of materials M. The turntable 12 includes a drive 16 for rotation thereof. Such an arrangement also allows material M to be discharged from the stacker 14 in any direction within the 360 degree rotational movement of the turntable 12.

For purposes of the present disclosure, reference to lateral sides or edges of the material M should be understood as those edges that lie along the sidewalls 18, 20 of the stacker 14, reference to a leading edge L is that edge of the material that is in the direction of discharge (see, for example, FIG. 4A) from the stacker 14 and reference to a trailing edge T is that edge of the material that is opposite the leading edge L. It is also to be understood that reference to the width W of the materials M in the stacker refers to that dimension between the pushers 22, 24, along the sidewalls 18, 20 of the assembly 10.

Those skilled in the art will appreciate that the stacker 14 includes the sidewalls 18, 20 and turntable 12, and typically includes a chute (not shown) above the turntable, through which the materials M are introduced onto the turntable 12.

The stacker 14 includes a pair of independently moveable sidewall assemblies 26, 28, which include the sidewalls, 18, 20, that define the lateral sides of the stacker 14. The sidewall assemblies 26, 28 have an elongated oval or race-track shape with the planar sidewalls 18, 20 essentially defining continuous, endless moving walls. A chute region 30 is defined between the sidewalls 18, 20. As seen in FIG. 2, the sidewall assemblies 26, 28 each include a drive 32, 34, such as a stepper or servomotor to precisely control the movement of each sidewall 18, 20. The motors 32, 34 are capable of operation independent of one another. That is, the movement of each sidewall 18, 20 can be controlled independent of the movement of the other sidewall. And, each sidewall 18, 20 is moveable in both directions. That is, each sidewall 18, 20 is movable in both the clockwise and the counter-clockwise directions.

The stacker 14 uses a series of pushers 22, 24 to provide gates or guides as the materials M are stacked in the stacker 14 and to move the stacked materials M out of the stacker 14 and off of the turntable 12. Rollers 25 located on the turntable 12 facilitate movement of the material out of the stacker 14 and off of the turntable 12. The pushers 22, 24 are elongated vertical members mounted to each sidewall 18, 20. The pushers 22, 24 includes a base portion 36 that mounts to the sidewall 18, 20 and a blade 38 that extends from the base portion 36, inwardly toward a centerline $C_{30}$ of the chute region 30.

The pushers 22, 24, are rigidly mounted to the sidewalls 18, 20. The pushers 22, 24 can, however, be removably mounted to the sidewalls 18, 20 so as to allow the pushers 22, 24 to be changed to, for example, vary the blade 38 size to accommodate materials M of different heights (the height of the materials being that dimension between the sidewalls 18, 20).

Unlike known stackers, which use pairs of symmetrically located, opposed pushers at the leading and trailing edges of the material to guide stacking of the material and to facilitate pushing the material from the stacker, referring to FIG. 3, the present pusher assembly 10 uses a single pusher 22 mounted to one sidewall 18 at the leading edge L of the material M and a single pusher 24 mounted to the opposing sidewall 20 at the trailing edge T of the material M, as the material M is positioned in the stacker 14 when in the home position. That is, in the home position, the pushers 22, 24, are staggered relative to one another across the chute region centerline $C_{30}$, and are thus diagonally opposed to one another. This is the position of the pushers 22, 24 as the material M is introduced to the stacker 14 from above, through a chute (not shown).

This arrangement provides a number of advantages over known fixed distance (fixed width) stackers which include pushers at each of the four corners of the material. For example, in the home position, the present stacker 14 can be readily adjusted to accommodate different width W materials M by moving the walls 18, 20 relative to one another to increase the distance d between the diagonally opposed pushers 22, 24. That is, to accommodate materials M having a greater width W, it is necessary only to move the sidewalls 18, 20 to increase the distance d between the leading edge 22 and trailing edge 24 pushers. Conversely, to accommodate materials M having a smaller width W, the sidewalls 18, 20 can be moved to decrease the distance d between the pushers 22, 24 at the leading L and trailing T edges of the materials M. Advantageously, this arrangement allows for adjusting the width W "on the fly" while also eliminating the need to take the stacker out of service to remove and reinstall the pushers to make the size adjustment accommodations.

In addition, in that the sidewall drives 32, 34 are operable independent of each other, such an adjustment is readily carried out by actuating one or both drives 32, 34 to reposition the respective sidewalls 18, 20 and respective pusher or pushers 22, 24.

Also unlike presently known stackers, the present stacker 14 uses an asymmetrical operating scheme during stacking and conveyance of the materials M. As described above, in the present system 10, as material M is fed into the stacker 14 in the home position, there is a single leading edge pusher 22 and a single trailing edge pusher 24 that are diagonally opposed to one another. Once the desired height of material M is reached, the drive 32 for the sidewall 18 on which the leading edge pusher 22 is positioned is actuated, bringing the leading edge pusher 22 around to the trailing edge T of the material M to a conveying position.

Once both pushers 22, 24 are at the trailing edge T of the materials M, both sidewall drives 32, 34 are actuated to move the materials M out of the stacker 14, during a conveying movement. At this point the materials M are discharged from the stacker 14, but both pushers 22, 24 are opposed to one another at the end of the conveying cycle. The sidewall 20 on which the trailing edge pusher 24 is mounted then continues in a forward direction until the trailing edge pusher 24 is located at the trailing edge T of the new material stack (at the home position). The sidewall 18 on which the leading edge pusher 22 is mounted, however, reverses, moving back to the home position, to reposition the leading edge pusher 22 at the leading edge L of the new material M stack (at the home position). The pushers 22, 24, are then both in the home position for receipt of the next stack of material.

In order to make efficient use of the movements of the sidewalls 18, 20, each sidewall includes two pushers 22a, 22b and 24a, 24b mounted thereto. In this manner, rather than each sidewall 18, 20 (or pusher 22, 24) moving through an entire 360 degree cycle for each stack of material M, the sidewalls 18, 20 each move through a 180 degree cycle with the non-used pushers positioned for the next subsequent cycle.

Referring now to FIGS. 4A-4D there is shown an operating scheme in which each sidewall 18, 20 includes a pair of pushers, with sidewall 18 including first and second leading edge pushers 22a and 22b and sidewall 20 including first and second trailing edge pushers 24a and 24b.

Figure 4A:
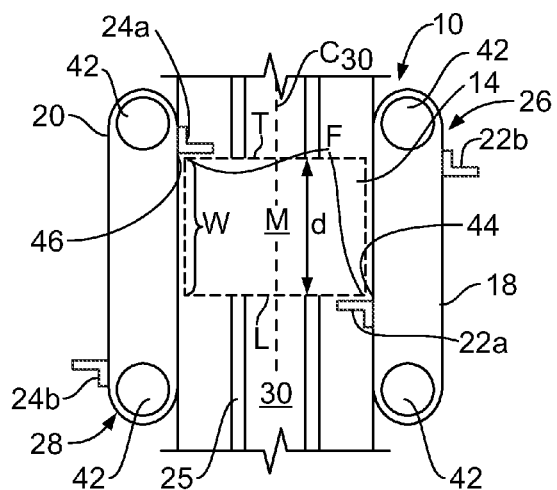
FIGS. 4A-4D are schematic representations of an operating cycle of the pusher assembly.

In the home position, as seen in FIG. 4A, the first leading edge pusher 20a is at the leading edge L of the stack of material and the first trailing edge pusher 24a is at the trailing edge T of the material M stack. As noted above, the distance d between the pushers 22a and 24a can be adjusted by actuating drives 32 and 34, to accommodate different widths of material M.

Figure 4B:
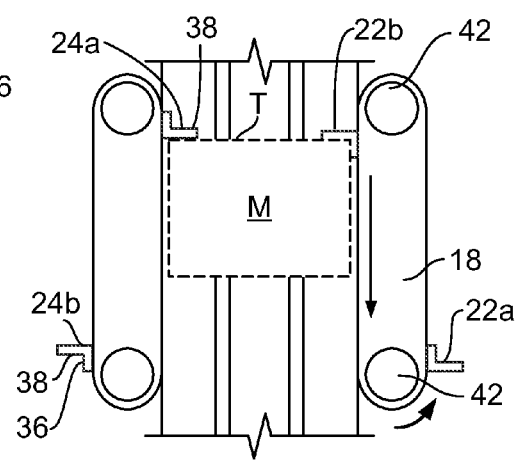
Figure 4C:
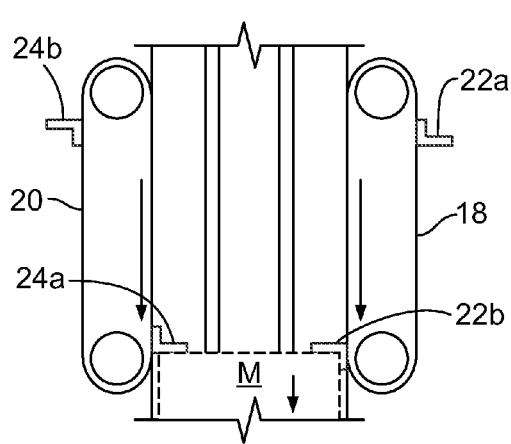

Once the desired stack height is achieved (which can follow rotation of the turntable 12 to equalize the height of the stack), the sidewall 18 with the leading edge pushers 22a and 22b is actuated to bring the second leading edge pusher 22b into engagement with the trailing edge T of the material M stack, as seen in FIG. 4B. With the second leading edge pusher 22b and the first trailing edge pusher 24a in engagement with the trailing edge T of the material M stack, both drives 32, 34 are actuated to move the material M out of the stacker as seen in FIG. 4C.

Figure 4D:
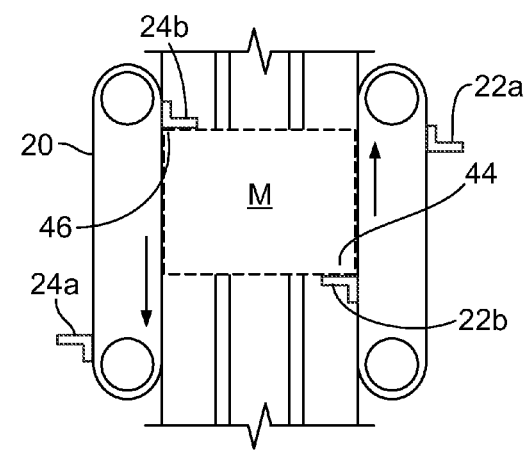

Following discharge of the material M, sidewall 20 drive 34 is actuated in the forward direction to move the second trailing edge pusher 24b into the home position. At the same time, sidewall 18 drive 32 is actuated in the reverse direction to move the second leading edge pusher 22b into the home position, as seen in FIG. 4D. The stacker 14 and pusher assembly 10 are now ready for receipt of a next subsequent stack of material M. As the system 10 operates through the next cycle, the positions of the first and second leading and trailing edge pushers 22a, 22b and 24a, 24b will again reverse.

It will be appreciated that in this arrangement, when the leading edge pusher 22a moves from the home position to the conveying position, it is the other leading edge pusher 22b on that sidewall 18 that engages the trailing edge T of the materials M.

The stacker system 14 can include one or more sensors 40 to sense or monitor the location of the pushers 22a, 22b and 24a, 24b throughout the movement/cycle of the sidewalls 18, 20. Such sensors 40 can be located within the turntable 12 and or on spindles 42 around which the sidewalls 18, 20 move. Other locations for such sensors 40 will be recognized by those skilled in the art. For example, those skilled in the art will recognize that the sensors 40 can be used to monitor a location of the sidewalls (which can then be used to determine the location of the pushers 22, 24), rather than directly monitoring the location of the pushers. Such sensors 40 can also be used to control the movement of the sidewalls 18, 20 to properly position the pushers 22a, 22b and 24a, 24b at all desired locations throughout the stacking and conveying cycles and to adjust for varying widths W of materials M.

In a presently contemplated operation, it is anticipated that folded edges of the materials M will be positioned at the pushers 22a, 22b, 24a, 24b. For example, when used with a broadsheet type of newspaper, that has a first vertical fold and a second horizontal fold it is anticipated that the two-fold corner, as indicated at F in FIG. 4A, (the corner at which the vertical and horizontal folds meet, which would result in the thickest part of the newspaper), will be positioned at, for example, the juncture 44 of the pusher 22a and the sidewall 18. As the turntable 12 rotates 180 degrees to equalize the height of the materials M, because the pushers 22a, 24a are diagonally opposed to one another, the two-fold corner would be located at the opposing pusher 24a, at its juncture 46 with the sidewall 20.

In the present disclosure, the words "a" or "an" are to be taken to include both the singular and the plural. Conversely, any reference to plural items shall, where appropriate, include the singular. All patents referred to herein, are hereby incorporated herein by reference, whether or not specifically done so within the text of this disclosure.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A pusher assembly for a stacker, comprising:
first and second opposing moving sidewalls, each sidewall defining a lateral side of a chute region and each sidewall extending continuously to a first height defining a height of the chute region, the chute region defining a centerline therethrough, each sidewall reciprocally movable parallel to the centerline and transverse to the centerline;
a first pusher located on the first sidewall and movable therewith;
a second pusher located on the second sidewall and movable therewith,
wherein the first and second pushers, when in a home position, are staggered from one another relative to the centerline, the first pusher engaged with a leading edge of a stack of material in the stacker and the second pusher engaged with a trailing edge of the stack of material in the stacker,
wherein in a conveying position, the first sidewall first moves independently of the second sidewall to engage the first pusher with the trailing edge of the stack of material, and then the first and second sidewalls both move in a forward direction such that the first and second pushers discharge the stack of material from the chute region, wherein the first and second sidewalls are configured to selectively engage and disengage the stack of material along a height of the stack of material in response to movement toward and away from the centerline, wherein the first pusher includes (a) and (b) first pushers located on the first sidewall diametrically opposed to one another and the second pusher includes (a) and (b) second pushers located on the second sidewall diametrically opposed to one another, wherein in the home position, the (a) first pusher is engaged with the leading edge of the stack of material and the (a) second pusher is engaged with the trailing edge of the stack of material, and wherein in the conveying position, the first sidewall moves to engage the (b) first pusher with the trailing edge of the stack of material, the (a) second pusher and the (b) first pusher moving in the forward direction to discharge the stack of material from the chute region, wherein after discharge of the stack of materials from the chute region, the (b) first pusher and (b) second pusher move to the home position, and wherein the (b) first pusher moves in a reverse direction to move to the home position and the (b) second pusher moves in the forward direction to the home position.

2. The pusher assembly of claim 1 including a drive associated with each of the sidewalls, the drives being operable independently of one another.

3. The pusher assembly of claim 2 wherein the drive for the first sidewall is operable in the forward direction and the reverse direction.

4. The pusher assembly of claim 3 wherein the drive for the second sidewall is operable in the forward and the reverse directions.

5. The pusher assembly of claim 1 including a sensor configured to sense a location of the first pusher relative to the home position and a sensor configured to sense a position of the second pusher relative to the home position.

6. The pusher assembly of claim 1 wherein the pusher assembly is mounted to a turntable.

7. A pusher assembly for a stacker, comprising:
first and second opposing moving sidewalls, each sidewall defining a lateral side of a chute region and each sidewall extending continuously to a first height defining a height of the chute region, the chute region defining a centerline therethrough;

(a) and (b) first pushers rigidly secured to the first sidewall at a fixed distance along the first sidewall relative to one another and movable with the first sidewall, the (a) and (b) first pushers being positioned diametrically opposed to one another on the first sidewall;

(a) and (b) second pushers rigidly secured to the second sidewall at a fixed distance along the second sidewall relative to one another and movable with the second sidewall, the (a) and (b) second pushers being diametrically opposed to one another on the second sidewall;

wherein the (a) first pusher and the (a) second pusher, when in a home position, are staggered from one another relative to the centerline, the (a) first pusher engaged with a leading edge of a stack of material in the stacker and the (a) second pusher engaged with a trailing edge of the stack of material in the stacker, wherein in a conveying position, the first sidewall first moves independently of the second sidewall to engage the (b) first pusher with the trailing edge of the stack of material, and then the first and second sidewalls both move in a forward direction such that the (b) first pusher and the (a) second pusher discharge the stack of material from the chute region, wherein after discharge of the stack of materials from the chute, the (b) first pusher and the (b) second pusher move to the home position, and wherein the (b) first pusher moves in a reverse direction to move to the home position and the (b) second pusher moves in the forward direction to the home position.

8. The pusher assembly of claim 7 including a drive associated with each of the sidewalls, the drives being operable independently of one another, the drive for the first sidewall being operable in the forward direction and the reverse direction.

9. The pusher assembly of claim 7 including a sensor configured to sense a location of the first pusher relative to the home position and a sensor configured to sense a position of the second pusher relative to the home position.

10. The pusher assembly of claim 7 wherein the pusher assembly is mounted to a turntable.

11. A method for pushing a stack of material from a stacker comprising the steps of:
positioning a first pusher at a leading edge of the stack of materials, along a first lateral side of the stack of materials at a home position such that only the first pusher is positioned at the leading edge of the stack of materials at the home position;

positioning a second pusher at a trailing edge of the stack of materials, along a second side of the stack of materials, opposite the first side of the stack of materials at the home position such that only the second pusher is positioned at the trailing edge of the stack of materials at the home position;

moving the first pusher, independently of the second pusher, into engagement with the trailing edge of the stack of materials on the first lateral side of the stack of materials to a conveyance position, moving the first pusher and the second pusher to discharge the stack of materials from the stacker;

positioning the first pusher at the home position; and positioning the second pusher at the home position, wherein the first pusher includes (a) and (b) first pushers and the second pusher includes (a) and (b) second pushers, and wherein the step of positioning the first pusher at the leading edge of the stack of materials, along the first lateral side of the stack of materials at the home position, is positioning the (a) first pusher at the leading edge of the stack of materials, wherein the step of positioning the second pusher at the trailing edge of the stack of materials, along the second side of the stack of materials, opposite the first side of the stack of materials at the home position, is positioning the (a) second pusher at the trailing edge of the stack of materials, wherein the step of moving the first pusher into engagement with the trailing edge of the stack of materials on the first lateral side of the stack of materials to a conveyance position, is moving the (b) first pusher into engagement with the trailing edge of the stack of materials, wherein the step of moving the first pusher and the second pusher to discharge the stack of materials from the stacker is moving the (b) first pusher and the (a) second pusher to discharge the stack of materials from the stacker, wherein the step of positioning the first pusher at the home position is positioning the (b) first pusher, at the home position, wherein the step of positioning the second pusher at the home position is positioning the (b) second pusher at the home position, wherein the step of positioning of the (b) first pusher at the home position includes moving the (b) first pusher in a reverse direction, and wherein the step of positioning of the (b) second pusher at the home position includes moving the (b) second pusher in a forward direction coincident with moving the (b) first pusher in the reverse direction.

12. The method of claim 11 including sensing a location of the first and second pushers at the home position.

* * * * *